US005513940A

United States Patent [19]
Florentin et al.

[11] Patent Number: 5,513,940
[45] Date of Patent: May 7, 1996

[54] REMOVABLE DOLLY FOR STEERABLE MOVEMENT OF A LOAD

[75] Inventors: Yves Florentin, Montigny-le-Bretonneux; Edmond Roustant, Montgeron, both of France

[73] Assignee: Aerospatiale Societe Nationale Industrielle, France

[21] Appl. No.: 270,362

[22] Filed: Jul. 5, 1994

[30] Foreign Application Priority Data

Jul. 5, 1993 [FR] France ................................ 93 08197

[51] Int. Cl.⁶ .................................................. B65G 7/00
[52] U.S. Cl. ...................... 414/458; 254/94; 280/63; 280/47.11; 280/47.34; 280/47.24; 280/47.131; 414/589; 414/444; 188/22
[58] Field of Search ...................... 414/548, 549, 414/460, 461, 589, 590, 444; 280/47.12, 63, 47.131, 47.17, 47.24, 47.34, 47.371, 47.11; 254/45, 120, 94; 188/21, 22, 23

[56] References Cited

U.S. PATENT DOCUMENTS

| | | | |
|---|---|---|---|
| 1,494,222 | 5/1924 | Dresser | 414/458 X |
| 2,228,247 | 1/1941 | Cunningham | 280/47.11 |
| 2,548,806 | 4/1951 | Montour | 280/47.24 X |
| 2,601,171 | 6/1952 | Schreck | 280/47.11 |
| 2,636,623 | 4/1953 | Corley | 414/458 X |
| 2,729,347 | 1/1956 | Jorgensen | 280/47.131 X |
| 2,908,266 | 10/1959 | Cooper | 280/47.34 X |
| 3,243,193 | 3/1966 | Fulmer et al. | 414/458 X |
| 3,250,513 | 5/1966 | Fenner et al. | 414/458 X |
| 3,750,694 | 3/1971 | Tantlinger | 414/458 |
| 4,570,959 | 2/1986 | Grinwald . | |
| 4,936,733 | 6/1990 | Girerd | 414/458 |

FOREIGN PATENT DOCUMENTS

| | | | |
|---|---|---|---|
| 3723302 | 1/1989 | Germany | 414/458 |
| 3830530 | 3/1990 | Germany . | |

*Primary Examiner*—Frank E. Werner
*Attorney, Agent, or Firm*—Remy J. VanOphem; John VanOphem

[57] ABSTRACT

A device for lifting, steerably moving and putting down a load includes a removable dolly which cooperates with an anchor plate fixed to the load. The removable dolly includes a chassis provided at its front part with a lifting and abutment system which cooperates with a complementary system on the anchor plate, the chassis being lockable to this plate. A steering system embodies two wheels mounted individually on the chassis and a set of links which hold the wheels parallel at all times. An orientable maneuvering bar is pivoted to the chassis and to the set of links. A locking arrangement is provided for selectively locking the maneuvering bar relative to the chassis. A device of this kind can be used to move and to position equipment to be slung underneath an aircraft.

14 Claims, 10 Drawing Sheets

REMOVABLE DOLLY FOR STEERABLE MOVEMENT OF A LOAD

BACKGROUND OF THE INVENTION

1. Field of the Invention

The invention concerns the steerable movement of a load such as a container or a pallet between areas in which it must in principle be set down directly, without the intermediary of any wheels, and in an accurate position. It is more particularly concerned with the unaided manipulation of medium-weight containers (typically weighing in the order of several hundred kilos) containing munitions or hardware to be slung underneath an aircraft, for example.

2. Description of the Prior Art

The handling means currently employed for unaided manual movement of containers are usually respective dollies mounted at the front and the rear of the container which simultaneously support and move the container.

Usually one of the dollies is steerable while the other is not. Accordingly, during movement of the container and especially during its final approach to a precisely defined position (for example, under part of an aircraft to which the content of the container is to be attached), it is necessary to carry out a large number of maneuvers with many turns, the larger the turning circle the greater the number of such maneuvers. As a result, positioning is time-consuming and laborious.

What is more, moving containers and loads in various locations, for example store rooms, hangars, elevators, aircraft carrier flight decks, with obstacles to circumvent (especially single or double ramps) in practice requires dedicated handling means in order to comply with applicable safety standards. In particular, it is necessary to ensure stability to prevent tilting which places a limit on the turning circle and, preferably, to immobilize the load during movement in the event of the operatives losing control of the load. There is also the need to have multipurpose equipment in order to reduce the total number of handling means to be kept in availability.

An object of the invention is therefore to provide a removable dolly for steerable movement of a load which is adapted to cooperate in a simple manner with the load in order to lift and move it, which provides a large turning angle for a small maneuvering angle (typically 50° for a turning angle of 70°), while guaranteeing high stability of the load in movement, even in the maximum turning configuration (including the situation in which, when the load is provided at each end with a removable dolly for steerable movement, with both dollies in the maximum turning configuration), requiring the load to be lifted through a small distance to its movable position, which advantageously allows for an immobilizing system either in the movable position (load stationary) or in the event of the operatives losing control of the load (dropping the load, for example), and all this from a simple and rugged structure.

French Patent Nos. 2,597,807 and 2,647,731 disclose a handling/moving device intended to be mounted on wheels and adapted to lift one end of a container so that it can be moved. The device includes an apron with means for removably fixing it to one side of the container, a chassis mounted on an axle pivoting about a vertical axis, the carriage sliding along this chassis and being articulated to the apron, and a jack system articulated to the apron and to the chassis to control their relative inclination. In use this device is attached to the container and then the jack system is actuated to lift the end of the container and then to slide under this end of the container the part of the chassis to which the axle is pivoted.

This device is not a satisfactory solution to the technical problem mentioned above in that, firstly, it does not provide a large turning angle without compromising the stability of the container (the farther the axle is turned the greater the risk of tilting sideways) and, secondly, it requires a source of hydraulic power. Finally, there is nothing to guarantee immobilization of the load in the event of the operatives losing control while the load is moving. Also, the pivots between the chassis and the apron are heavily loaded during lifting and lowering which is prejudicial both to their stiffness and to the ruggedness of the combination. Note that this document is not concerned with manual movement but rather with motorized movement since it requires an auxiliary motive power source (see above) and is directed to the provision of a road transport system capable of travelling at speeds in the order of 100 kph.

SUMMARY OF THE INVENTION

To solve the aforementioned technical problem the invention proposes a device for lifting, steerably moving and putting down a load including a removable dolly including a chassis, a steering system and an orientable maneuvering bar. The chassis embodies, in a front part, fixed anchor means including in the upper part lifting means and in the lower part first abutment and locking means. The steering system has two steerable wheels mounted in yokes individually pivoted to the chassis about substantially vertical shafts offset transversely relative to each other a system of links adapted to hold the wheels parallel at all times and including two longitudinal links pivoted to the yokes about substantially horizontal shafts and a transverse link articulated at its ends to the longitudinal links about a substantially vertical shaft. The maneuvering bar is provided with a handle for use by an operative and is pivoted to the chassis by a double pivot and to the transverse link about a substantially vertical pivot. The maneuvering bar and the chassis is further provided with complementary temporary locking means adapted to immobilize the maneuvering bar in a predetermined orientation relative to the chassis, as required.

The device also embodies an anchor plate including in the upper part retaining means and in the lower part second abutment and locking means. The retaining means is adapted to be fitted over the lifting means from above so as to form conjointly a temporary pivot with a transverse. disengagable only by lowering of the lifting means relative to the retaining means, the first and second abutment and locking means being adapted to cooperate to lock the chassis and the plate in a movable configuration when the retaining and lifting means cooperate. Further, the anchor plate is adapted to be fixed to one end of the load at a height such that when the chassis is in the movable configuration the lifting means are higher than the retaining means.

According to preferred features of the invention, some of which may be combinable with others:

the removable dolly has immobilizing means including brake shoes fastened to the transverse links of the steering system and brake plates disposed between the brake shoes and the wheels, the braking action varying with the downward inclination of the maneuvering bar and the transverse link;

the brake plates are disposed horizontally and held vertically on supports attached to the yokes;

the lifting means include at least one horizontal shaft portion and the retaining means include at least one horizontal axis split bearing having a downwardly directed entry slot;

the lifting means and the retaining means cooperate in at least two areas offset transversely;

the first and second abutment and locking means include two abutments fastened together and an independent abutment adapted to engage between the fastened together abutments in the rolling configuration, a rod being mounted in one of the fastened together abutments to slide between a pulled out configuration wherein the rod allows the independent abutment to move freely and a pushed in configuration in which the rod passes through the other of the fastened together abutments and the independent abutment in the movable configuration;

the fastened together abutments are offset horizontally from each other and the rod slides horizontally;

the rod is spring-loaded into the pushed in configuration;

the fastened together abutments are fixed to the chassis and the independent abutment is fixed to the anchor plate;

the chassis includes a horizontal plate to which is attached a vertical plate carrying the lifting means and the first abutment and locking means;

the maneuvering bar is pivoted about a horizontal shaft to a member disposed under the chassis and pivoted to the latter about a vertical shaft;

the maneuvering bar enables a turning angle of the wheels relative to a longitudinal plane of the dolly greater than the maneuvering angle of the bar;

the complementary temporary locking means include a longitudinal bar mounted to slide relative to the maneuvering bar and a receiving block fastened to the chassis and including a housing adapted to receive the front end of the longitudinal bar in a pushed in configuration of the latter; and the receiving block is fixed under the chassis.

Objects, features and advantages of the invention emerge from the following description given by way of non-limiting example only with reference to the appended drawings.

DETAILED DESCRIPTION OF THE PREFERRED EMBODIMENT

Figure 1:
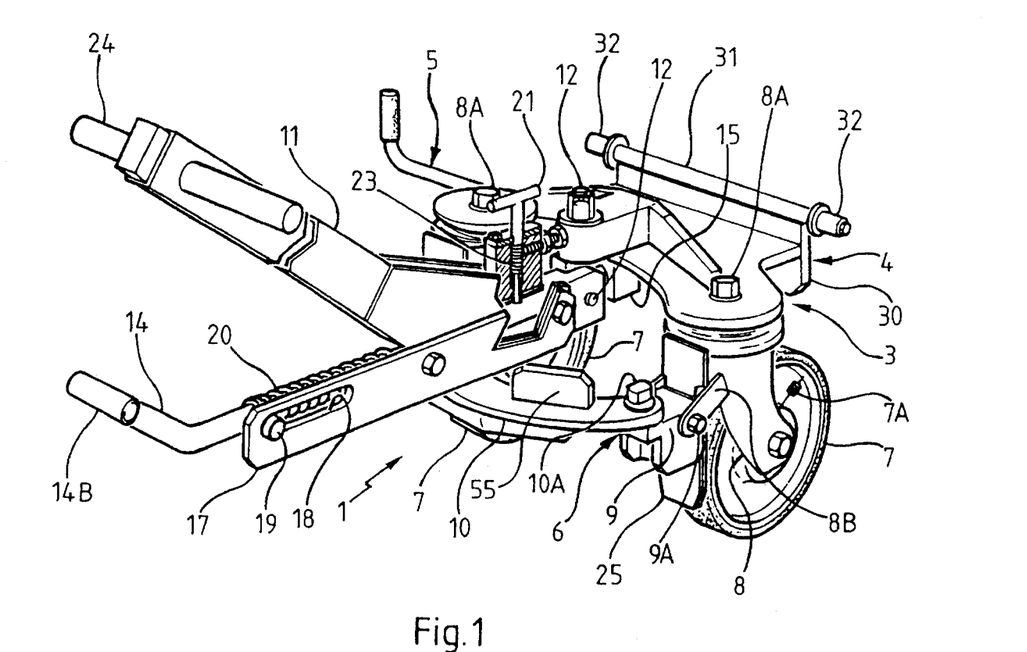
FIG. 1 is a perspective view of a removable dolly in accordance with the invention in a configuration allowing steerable movement.
Figure 2:
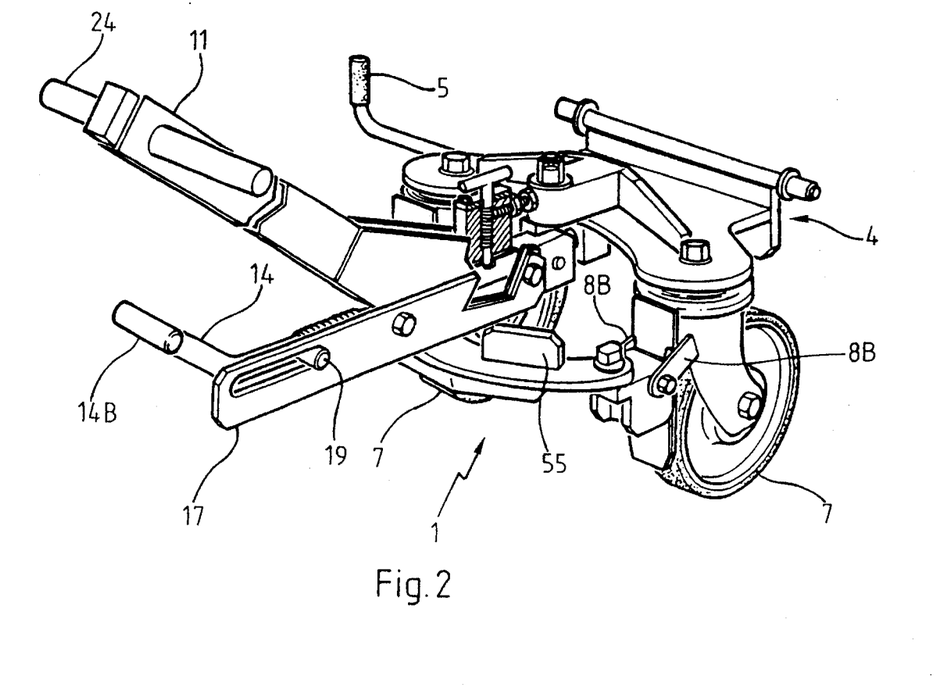
FIG. 2 is a perspective view of the removable dolly in a non-steerable movement configuration.
Figure 4:
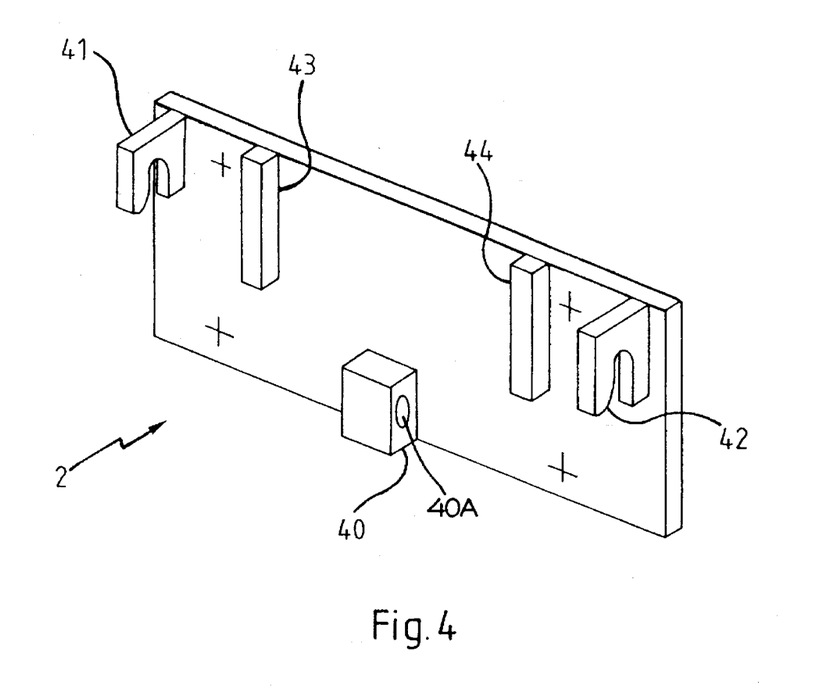
FIG. 4 is a perspective view of a plate designed to be fixed to one end of the container to cooperate with the removable dolly from FIG. 1 for the purpose of steerable movement.

FIGS. 1 and 2 show a steerable removable dolly 1 adapted to cooperate with an unsophisticated anchor plate such as the plate 2 shown in FIG. 4 for moving a container 100 of any kind fitted with the plate 2 at one end.

Figure 3:
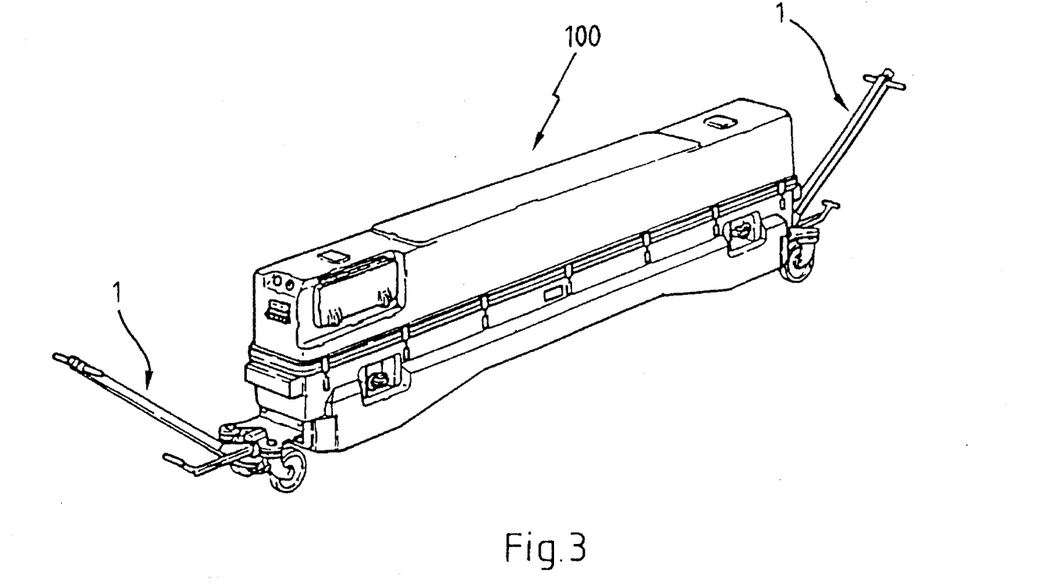
FIG. 3 is a perspective view of a container fitted at each end with a removable dolly as shown in FIGS. 1 and 2.

The container 100 (FIG. 3) is preferably provided with an anchor plate at each end and two dollies 1 are temporarily attached to it for moving it. The container 100 has a mass of several hundred kilos (it contains a missile, for example) and the dollies 1 are designed to enable it to be moved anywhere (including under an aircraft or under a crane, for example) by unaided manpower alone and by forward, reverse and lateral "crabwise" movements, in total safety.

The removable dolly 1 includes a chassis 3 having at the front fixed anchor means 4 adapted to cooperate with the anchor plate 2 and locking means embodying a rod 5. The dolly is also provided with a steering system 6 including right-hand and left-hand wheels 7 (in this example provided with lubrication nipples 7A) mounted in yokes 8 individually articulated to the chassis 3 about substantially vertical shafts 8A, the yokes being coupled together so that the wheels remain parallel at all times by a system of links including two longitudinal links 9 which in practice are very short and are articulated to the yokes about substantially horizontal pivot shafts 9A and a transverse link 10 articulated at its ends to the longitudinal links about substantially vertical shafts 10A.

A maneuvering bar 11 is pivoted to the chassis by a double pivot 12 and to the transverse link 10 about a substantially vertical peg or pivot 13 (see FIGS. 5 to 8).

Figure 5:
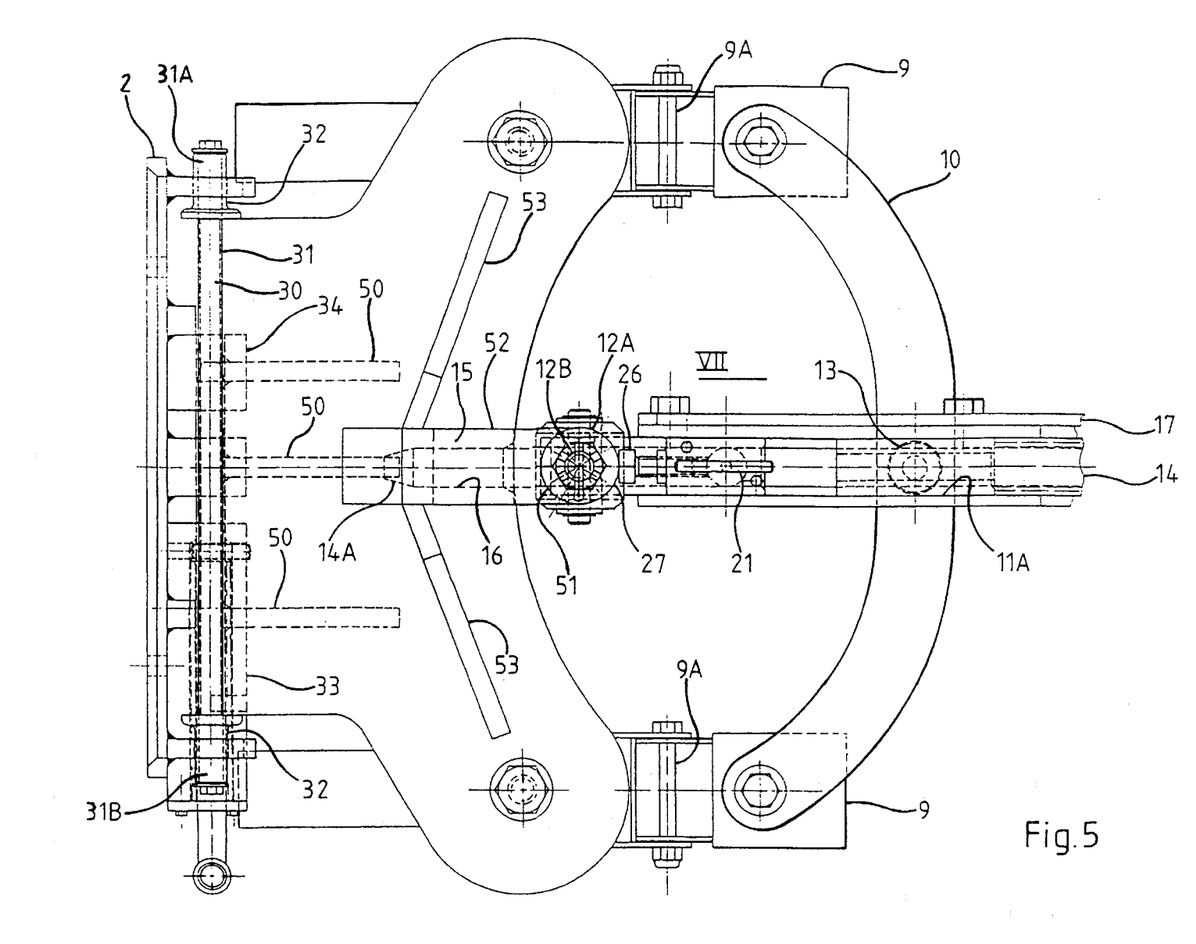
FIG. 5 is a partial top view (without the maneuvering bar and without the reinforcements of the FIG. 7 link) of the removable dolly in a configuration for cooperation with the plate from FIG. 4.
Figure 6:
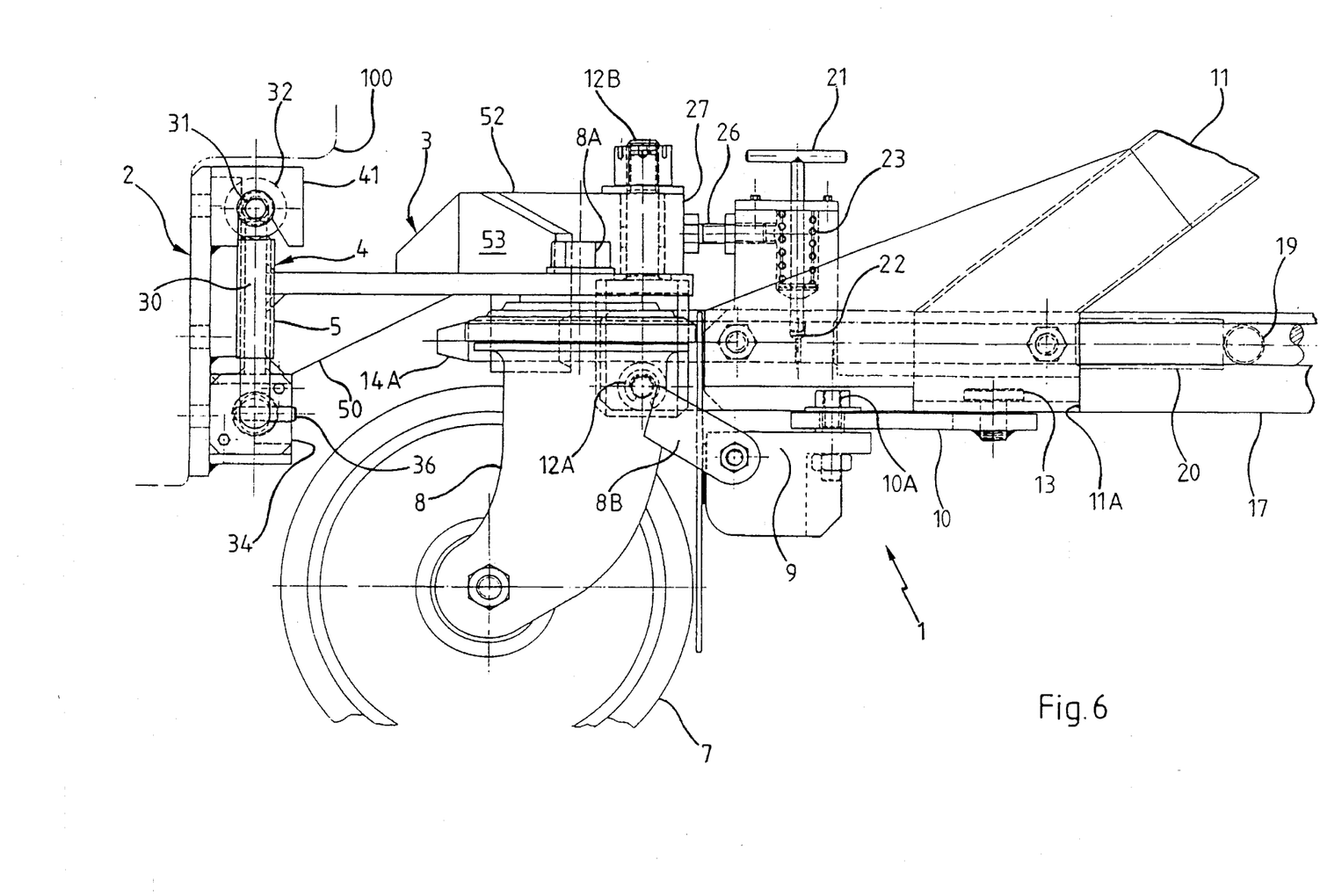
FIG. 6 is a partial side view of the removable dolly (without the reinforcements of the FIG. 7 link)

The removable dolly 1 advantageously includes a device adapted to lock the chassis 3 and the maneuvering bar 11 together as required. The locking device includes a longitudinal bar 14 adapted to slide longitudinally relative to the maneuvering bar 11 and a block 15 attached to the chassis having a housing 16 (hardly visible in FIG. 1, but seen in FIGS. 9 and 10) adapted to receive the forward end 14A of the longitudinal bar 14 according to whether the latter is retracted (FIG. 1) or advanced (FIGS. 2, 5 and 6).

Sliding of the sliding bar 14 relative to the maneuvering bar 11 is guided by a side flange 17 fixed to the maneuvering bar 11 and in which is formed a guide opening 18 in which slides a peg 19 projecting radially from the longitudinal bar 14. The flange 17 thus determines the relative inclination of the maneuvering and longitudinal bars 11 and 14, which is typically between 33° and 43°. The ends of the guide opening 18 provide abutments for the peg 19 and therefore delimit movement of the longitudinal bar 14 relative to the flange 17. The longitudinal bar is preferably curved so that its rear end 14B (opposite the end 14A adapted to enter the block 15) is disposed transversely, enabling an operative to maneuver the longitudinal bar 14 easily, for example by pushing on it with his foot.

The sliding longitudinal bar 14 is spring-loaded into one of its two end positions, in this example its retracted position. In this example this is achieved by means of a coil spring 20 around the longitudinal bar 14 and bearing against a bearing surface (not shown) on the flange or on maneuvering bar 11.

A locking pin 21 is advantageously provided on the maneuvering 11 to cooperate with a radial blind hole 22 (FIG. 6) in the longitudinal bar 14 when the latter is in the advanced position to immobilize the bar. To release the longitudinal bar 14 the pin 21 is pulled up against the action of a return spring 23.

The maneuvering bar 11 is designed to be grasped and oriented a will by an operative and to this end has a transverse handle 24.

The yokes 8 of the wheels are advantageously provided with brake plates 25, which are vertical plates in this example, between the longitudinal links 9 and the wheels. The longitudinal links 9 are advantageously solid and extend downwards from the pivot shafts 9A to form brake shoes so that any unintentional lowering of the maneuvering bar 11 causes the links 9 to pivot downwards and the brake plates 25 to be applied to the wheels. This automatically immobilizes the dolly either in the movable position (load stationary) or in the event of the operative holding the maneuvering bar 11 losing control, as in this case the bar is inclined downwards.

The brake plates 25 are disposed horizontally and held vertically on supports 8B of the yokes 8 to which the links 9 are pivoted. As an alternative to this (not shown) the supports can be fixed to the yokes 8. The supports are preferably provided with return springs (not shown) to hold them away from the wheels.

Abutments 26 and 27 (see also FIGS. 5 and 6) are advantageously provided on the maneuvering bar 11 and the chassis 3 to limit straightening of the maneuvering bar 11 relative to the chassis 3 to a predetermined acceptable value and possibly to protect the brake plates when the latter are positioned relative to the links 9. One of these abutments, in this example the abutment 26 carried by the maneuvering bar 11, is adjustable, consisting of the head of a screw whose depth of insertion into the maneuvering bar 11 can be varied.

It will be understood that the engagement of the longitudinal be 14 in the block 15, the effect of which is to lock the longitudinal bar 14 to the chassis, also neutralizes the braking system to enable maneuvering by a single operative at the second axle, which retains the steering capability.

The fixed anchor means of the chassis are rigidly fixed to the chassis, as their name implies.

The fixed anchor means 4 include a vertical plate 30 having lifting means at its upper end, in this example constituted by ends 31A and 31B of a transverse bar 31 which are advantageously covered with low-friction sleeves forming wear rings 32 (see also FIGS. 5, 6, 9 and 10). The vertical plate 30 is provided in its lower part with abutment means (see FIGS. 5, 6, 9 and 10) consisting in this example of two blocks 33 and 34 having edges adapted to face the anchor plate 2 in the movable configuration.

Figure 9:
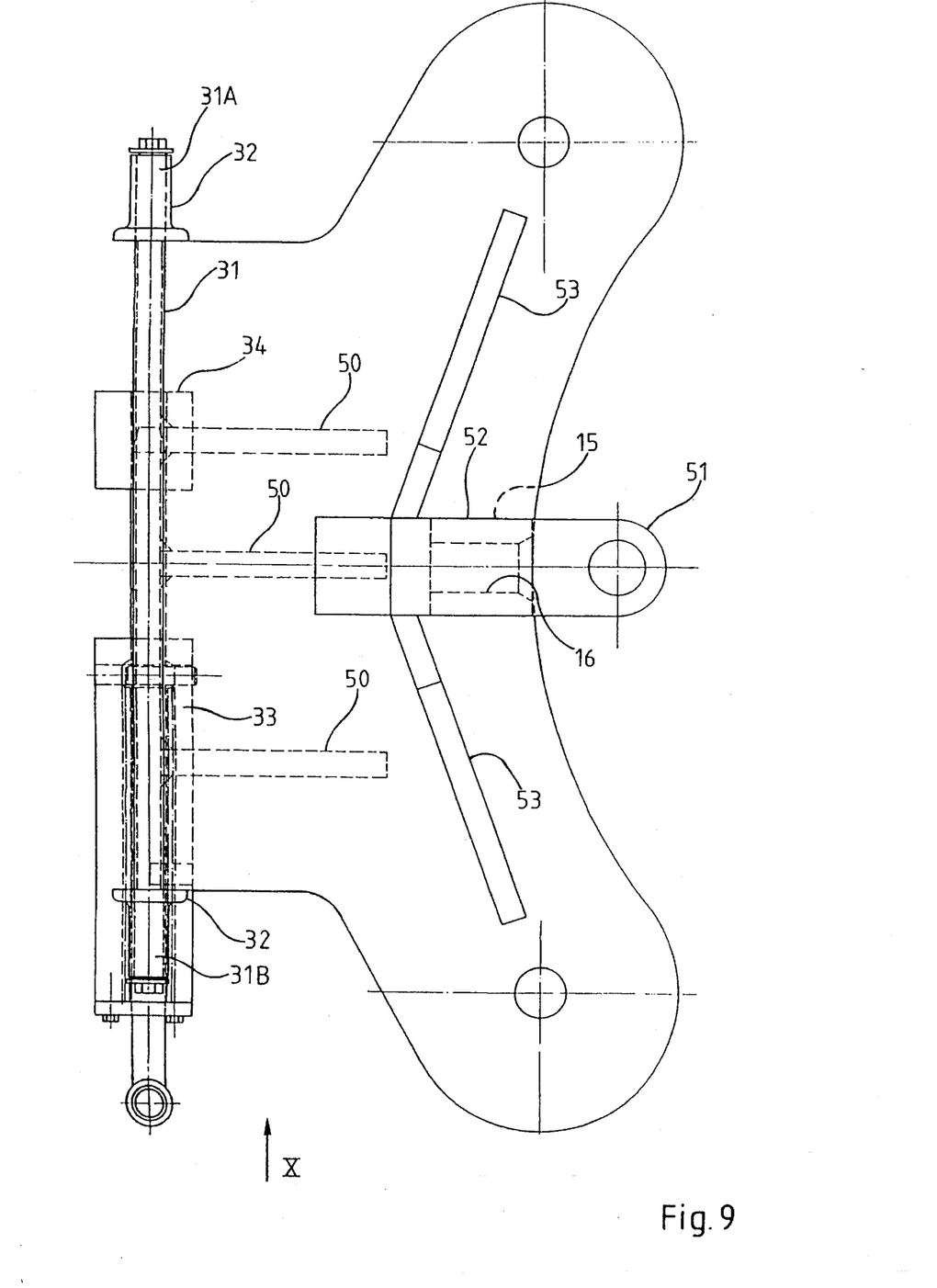
FIG. 9 is a top view of the chassis of the removable dolly.

The locking means carried by the chassis in this example include the rod 5 which is adapted to slide transversely through each of the blocks 33 and 34. As shown in FIGS. 5 and 9, one of the blocks, in this example block 33, extends over part (preferably slightly less than half) the width of the plate 30 to enable good sliding retention of the rod 5 and, conjointly with the other block, to leave a half-width central space for an abutment member 40, best seen in FIG. 4, on the plate 2.

Figure 11A:
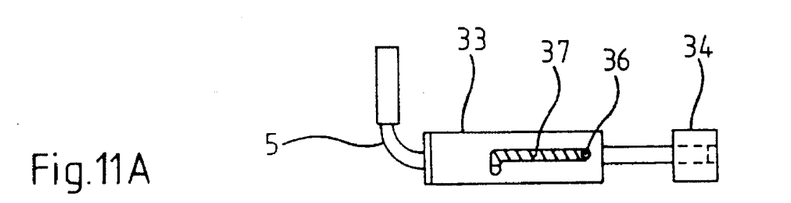
FIGS. 11A and 11B are views in elevation of locking means integral with the chassis from FIGS. 9 and 10 in locked and unlocked configurations, respectively.
Figure 11B:
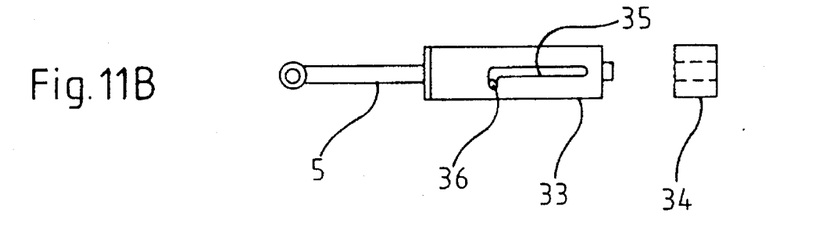

The block 33 includes a longitudinal L-shape opening 35 (see FIGS. 11A and 11B) in which engages a radial peg 36 on the rod 5, in order to delimit the relative movement of the latter. The transverse part of the L-shape of the opening 35 is opposite to the block 34 with the result that the rod can rotate on itself when the radial peg 36 faces the transverse part of the L and so lock into the pulled out position. A spring 37 spring-loads the rod into the pushed in position (FIG. 11A).

The anchor plate 2 (see FIG. 4) includes in its upper part retaining means adapted to cooperate with the lifting means 31A and 31B to form therewith a temporary pivot with a horizontal axis. In this example the retaining means are two hooks 41 and 42 in the upper right-hand and left-hand corners with their entry slots facing downwards. These hooks, which constitute downwardly split horizontal bearings, are adapted to receive from below the ends 31A and 31B provided with their wear rings 32. Locating abutments 43 and 44 are adapted to come into contact with the transverse bar 31 when the latter is vertically underneath the entry slots of the hooks.

The bottom part of the plate 2 carries the previously mentioned abutment member 40. This is adapted to abut against the vertical plate 30 in the movable configuration. A cylindrical bore 40A through the abutment member 40 is adapted to be coaxially aligned with the housings of the abutment blocks 33 and 34 of the chassis when these abut against the anchor plate 2 (the member 40 abuts against the plate 30 of the chassis 3 if the latter plate descends far enough): it is then possible, simply by pivoting the rod 5 from the FIG. 11B configuration, and exploiting the action of the spring 37, to move the rod to the pushed in position, so that it passes through the members 40 and 34 to lock the chassis 3 and the plate 2 together.

FIGS. 5 to 10 show various constructional details of the removable dolly 1.

Figure 10:
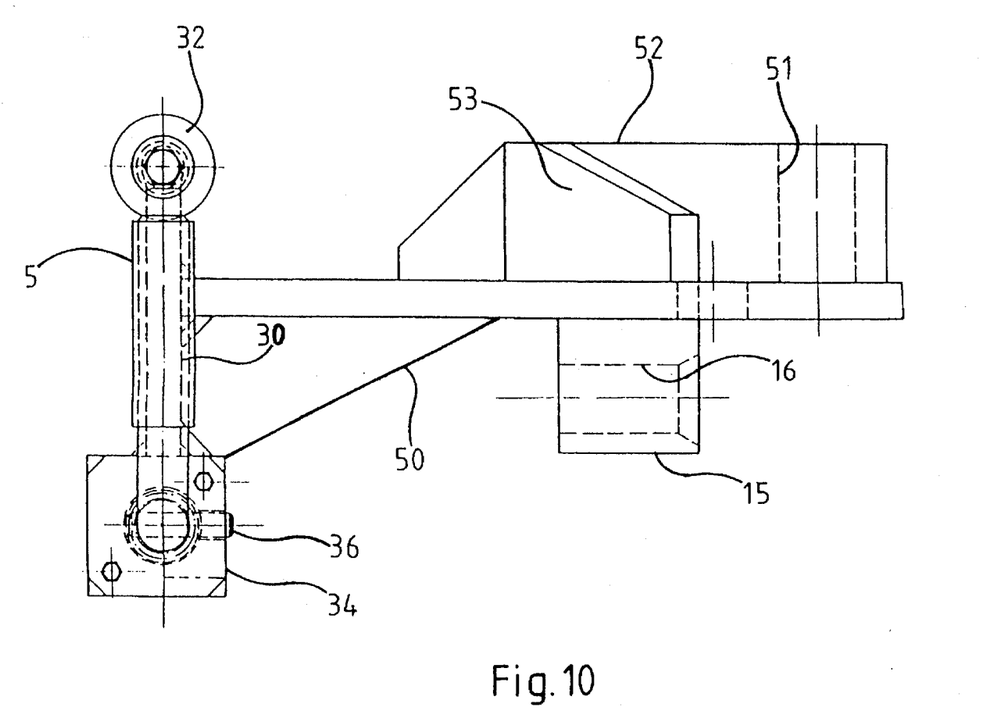
FIG. 10 is an elevational view of the chassis in the direction of the arrow X in FIG. 9.

FIGS. 5, 6 and 10 show that the rigid fixing of the vertical plate 30 to the chassis is strengthened by vertical reinforcing plates 50.

The double pivot linking the chassis 3 and the maneuvering bar 11 is under the plate under which the yokes of the wheels pivot, with a horizontal shaft 12A and a vertical shaft 12B (see FIG. 5 and 6). The vertical shaft 12B is engaged in a hub 51 formed on the chassis 3 in a massive block 52 projecting upwards. Generally transverse reinforcement plates 53 stiffen the block 52 relative to the remainder of the chassis. The block 52 also constitutes the abutment 27 on which the adjustable abutment 26 can bear (see FIGS. 5 and 6). It will be understood that this arrangement with the greatest possible number of parts between the wheels minimizes the overall height and the height above ground level of the center of gravity.

Figure 7:
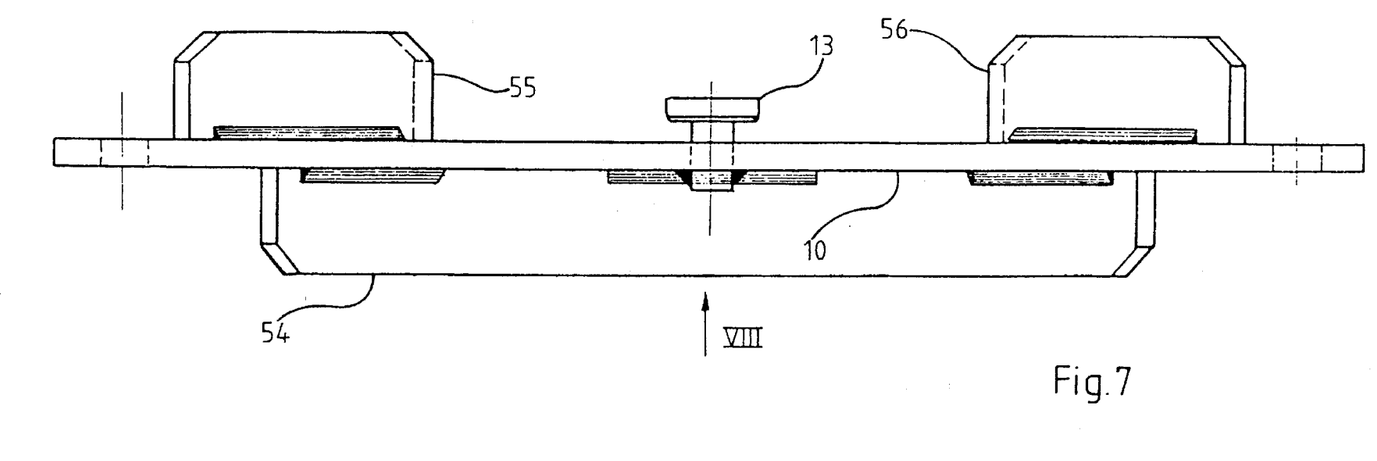
FIG. 7 is a view in elevation as seen in the direction of the arrow VII in FIG. 5 of the transverse steering link of the removable dolly.
Figure 8:
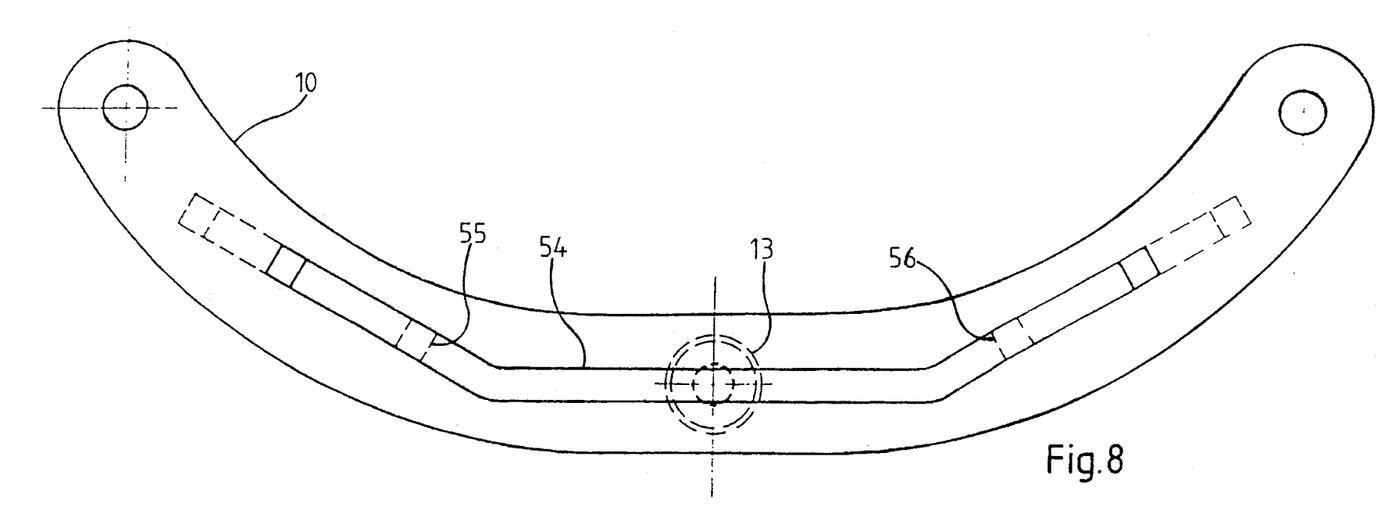
FIG. 8 is a bottom view of the link as seen in the direction of the arrow VIII in FIG. 7.

FIGS. 7 and 8 show that the transverse link 10 is formed by a circular arc shape horizontal plate. To stiffen it, it has a curved vertical wall 54 running along it underneath it (not shown in FIGS. 5 and 6) and two separate plates 55 and 56 on the top and disposed one on each side of the maneuvering bar 11 when the latter is fitted (see FIGS. 1 and 2). Thus (see FIG. 14), for a turning angle $\alpha$ of approximately 70° a maneuvering angle $\beta$ of 50° is obtained; similarly, a turning angle of 90° can be obtained for a maneuvering angle of 70°.

Figure 14:
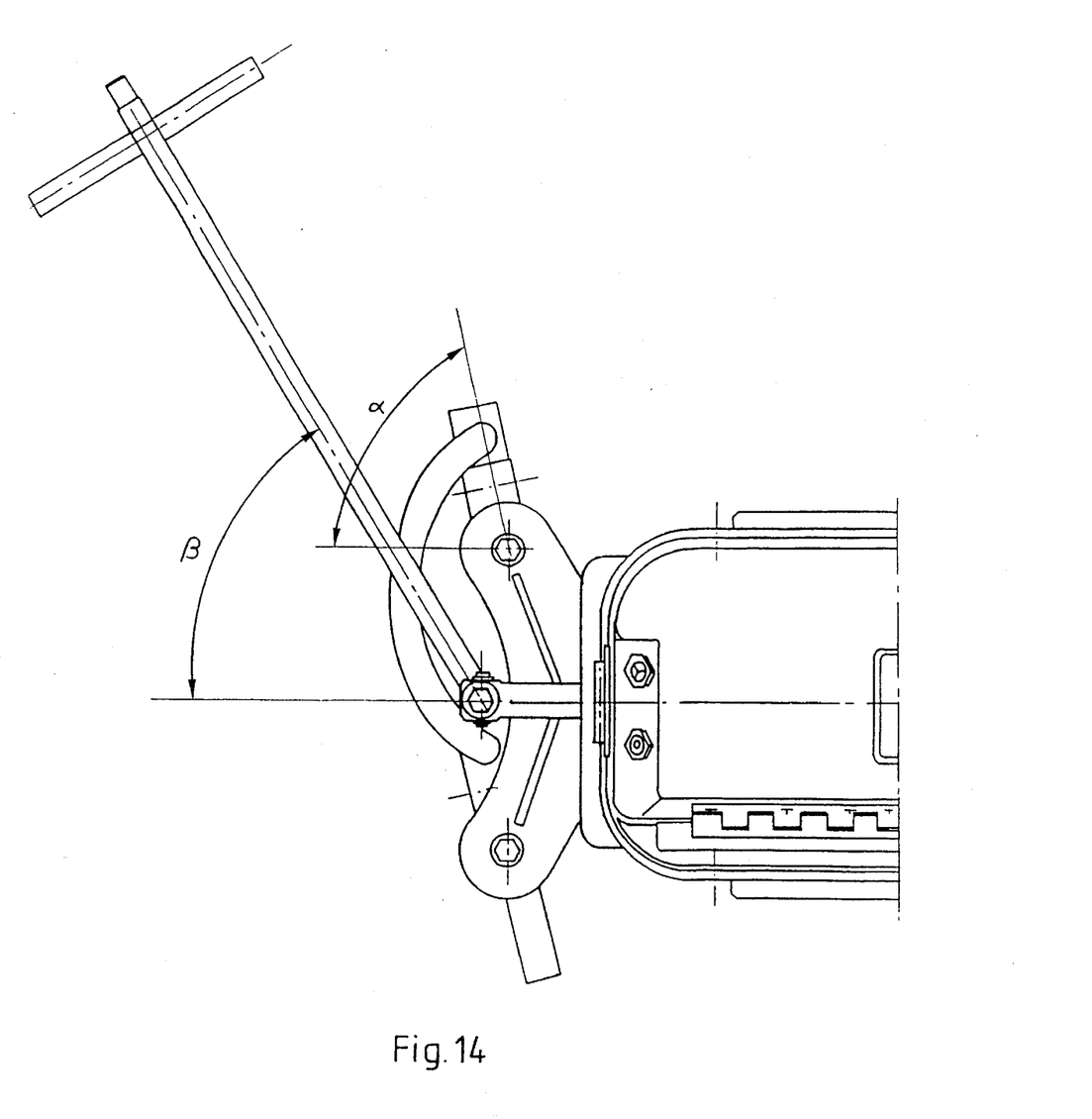
FIG. 14 is a top view of the removable dolly in a turning position.

Generally speaking $\alpha > \beta$ where $\alpha$ is the angle between the vertical plane of the wheels and the longitudinal vertical plane of the dolly and $\beta$ is the angle between the vertical plane of the maneuvering bar and the longitudinal vertical plane of the dolly.

In this regard, the maneuvering bar includes a slot 11A adapted to receive the peg 13 to enable longitudinal movement between the maneuvering bar 11 and the link 10. Note that the turning angle is increased by increasing the length of the slot 11A.

Figure 12:
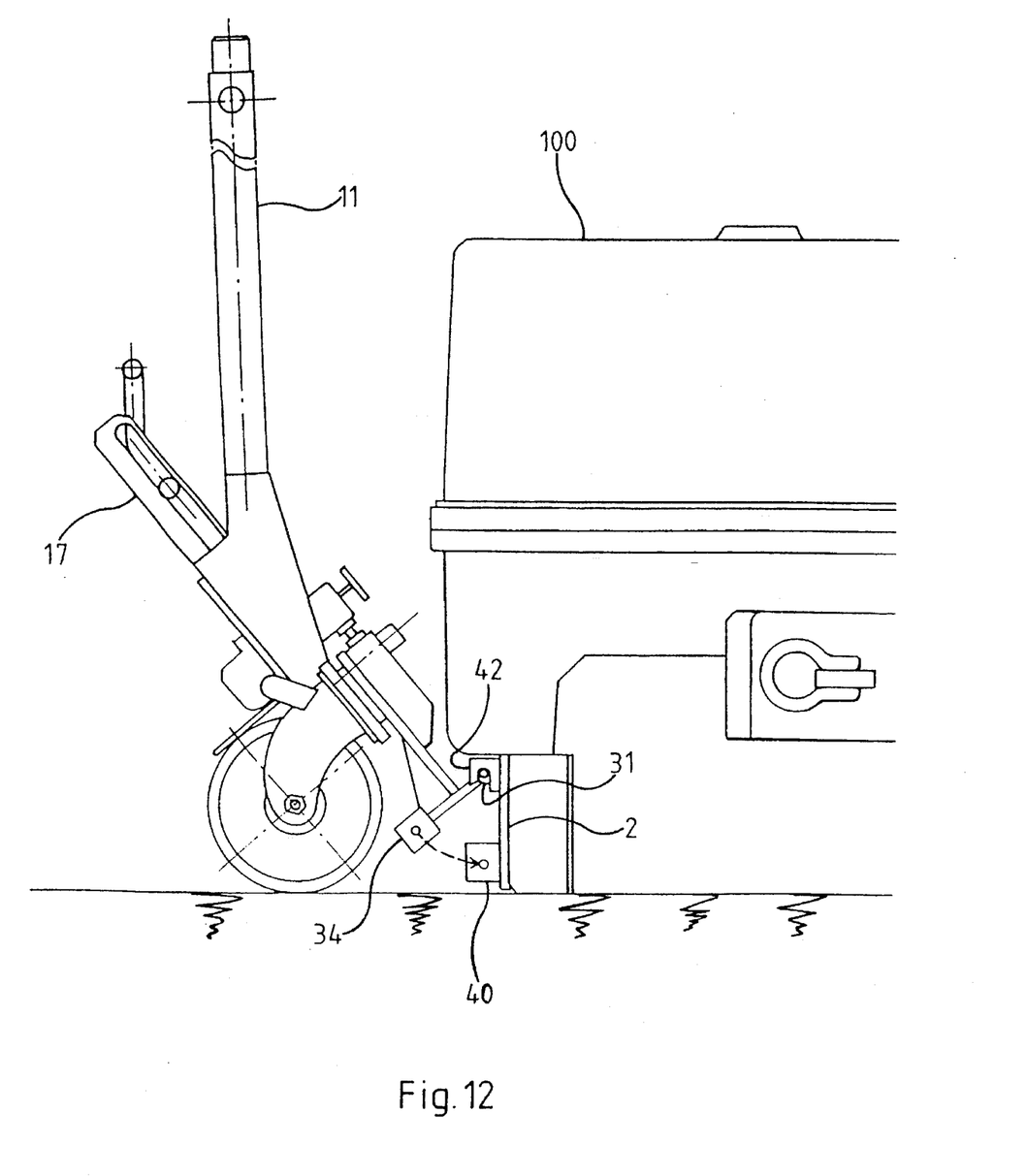
FIG. 12 is a side elevational view of the removable dolly during engagement with one end of the container.
Figure 13:
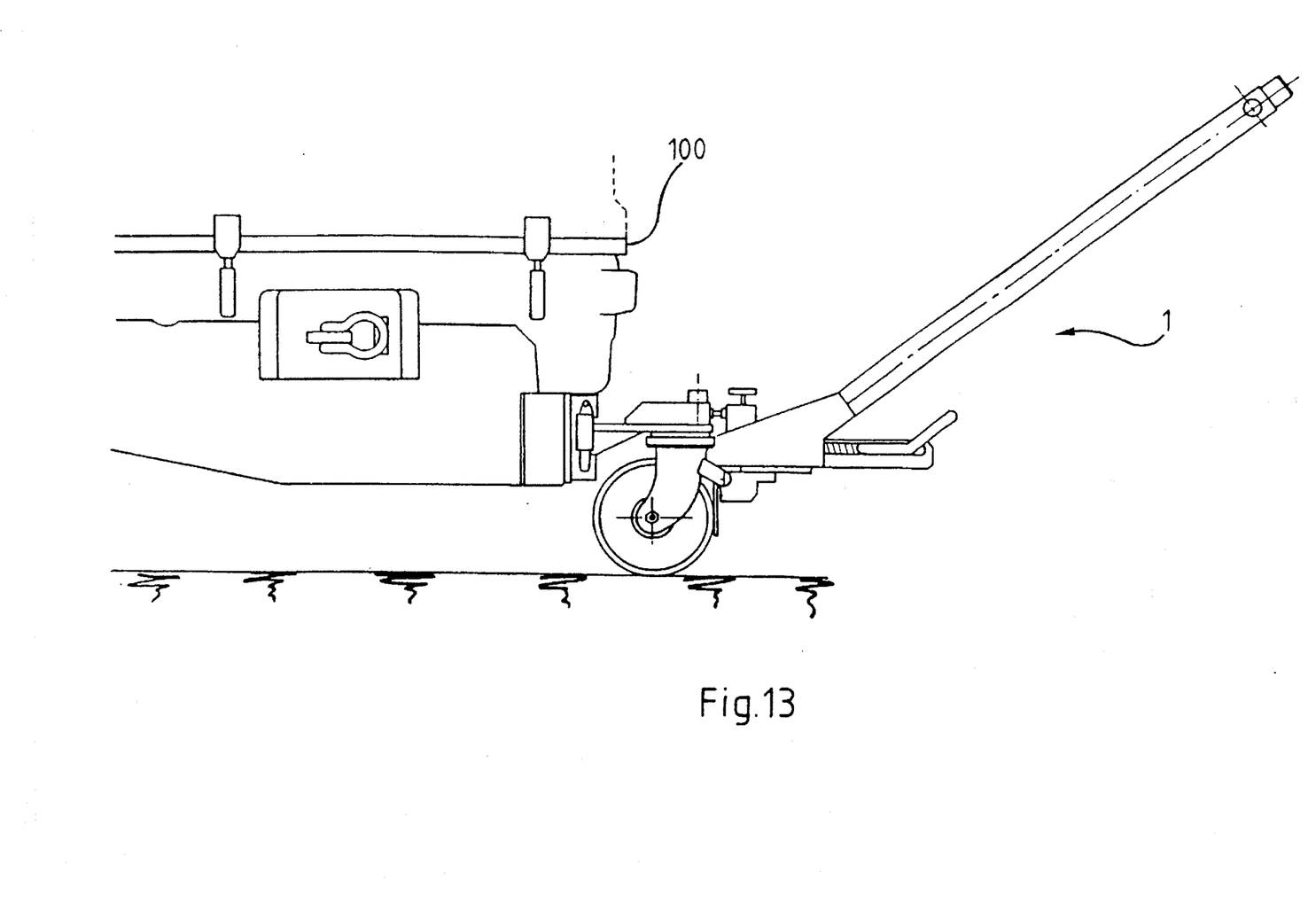
FIG. 13 is a side elevational view of the opposite side of the removable dolly in the movable configuration.

The use of the removable dolly just described is shown in FIGS. 12, 13 and 14.

The anchor plate 2 is fixed to the container 100 at a level such that the retaining means or blocks 41 and 42 are lower than the lifting means 31A and 31B of the chassis when the latter is approximately horizontal (in the movable configuration).

The first thing is to lock the dolly into the non-steerable configuration by moving the longitudinal bar 14 forwards until it enters the block 15 of the chassis.

The locked dolly is then tilted forwards until the lifting means 31A and 31B abut against the anchor plate 2 under the retaining means 41 and 42. Using the locked dolly as a lever, it is possible to raise the end of the container by pushing down on the maneuvering bar 11. The lifting movement continues until the blocks 33 and 34 abut against the anchor plate 2; all that is then required is to operate the rod 5 to lock the dolly 1 to the anchor plate 2.

The same process is carried out at the other end of the container.

It is then a simple matter, if required, to pull the locking bar 14 of one or both dollies towards the rear to begin steerable movement of the container.

It is clear that the use of two dollies, both in the steerable movement configuration, is an easy and effective way of reducing the maneuvers required to position the container correctly.

The opposite procedure is followed to put the container down.

It goes without saying that the foregoing description has been given by way of non-limiting example only and that numerous variants can be put forward by the person skilled in the art without departing from the scope of the invention.

In particular, the bearings or blocks 41 and 42 and the bar transverse bar 31 can be interchanged (subject to inverting the bearings).

It will be understood that the removable dolly in accordance with the invention:

enables a substantial reduction in the number of turning maneuvers to move a container into a given position by virtue of the possibility of using two steerable dollies;

guarantees good stability even in sharp turns since the vertical shafts about which the wheels pivot remain fixed relative to the container, making use extremely safe;

the possible incorporation of a braking device into the dollies enables easy immobilization of the transported container, both statically and dynamically (relying on the weight of the maneuvering bar), which also contributes to safe operation;

the anchor plate that has to be attached to the ends of the container is of very simple design;

the dolly itself enables the load to be lifted to the movable height without necessitating the use of any other equipment such as a forklift truck;

the lift height is moderate;

the dolly can have a low overall height;

the additional anchor means provided on the dolly and on the anchor plate, respectively, are easy and quick to lock and unlock; and the locking of the maneuvering bar to the chassis can have two functions: not only to render the dolly non-steerable in movement, but also to enable lifting of the load.

What is claimed is:

1. Device for lifting, steerably moving and putting down a load including:

a removable dolly including a chassis, a steering system and an orientable maneuvering bar, said chassis comprising, in a front part, fixed anchor means including in an upper part lifting means and in a lower part first abutment and locking means, said steering system including two steerable wheels mounted in yokes individually pivoted to the chassis about substantially vertical shafts offset transversely relative to each other and a system of links adapted to hold said wheels parallel at all times and including two longitudinal links pivoted to said yokes about substantially horizontal shafts and a transverse link articulated at its ends to said longitudinal links about a substantially vertical shafts, said maneuvering bar being provided with a handle for use by an operative and being pivoted to said chassis by a double pivot and to said transverse link about a substantially vertical pivot, said maneuvering bar and said chassis being further provided with complementary temporary locking means adapted to immobilize said maneuvering bar in a predetermined orientation relative to said chassis, as required, an anchor plate including in an upper part retaining means and in a lower part second abutment and locking means, said retaining means being adapted to be fitted over said lifting means from above so as to form conjointly a temporary pivot with a transverse axis disengagable only by lowering of said lifting means relative to said retaining means, said first and second abutment and locking means being adapted to cooperate to lock said chassis and said plate in a movable configuration when said retaining and lifting means cooperate, said anchor plate being adapted to be fixed to one end of said load at a height such that when said chassis is in said movable configuration said lifting means are higher than said retaining means.

2. Device according to claim 1 wherein said removable dolly includes immobilizing means including brake shoes fastened to said transverse links of said steering system and brake plates disposed between said brake shoes and said wheels, the braking action varying with a downward inclination of said maneuvering bar and said transverse link.

3. Device according to claim 2 wherein said brake plates are disposed horizontally and held vertically on supports attached to said yokes.

4. Device according to claim 1 wherein said lifting means include at least one horizontal shaft portion and said retaining means include at least one horizontal axis split bearing having a downwardly directed entry slot.

5. Device according to claim 1 wherein said lifting means and said retaining means cooperate in at least two areas offset transversely.

6. Device according to claim 1 wherein said first and second abutment and locking means include two abutments fastened together and an independent abutment adapted to engage between said fastened together abutments in said rolling configuration, a rod being mounted in one of said fastened together abutments to slide between a pulled out configuration wherein said rod allows said independent abutment to move freely and a pushed in configuration in which said rod passes through the other of said fastened together abutments and said independent abutment in the movable configuration.

7. Device according to claim 6 wherein said fastened together abutments are offset horizontally from each other and said rod slides horizontally.

8. Device according to claim 6 wherein said rod is spring-loaded into tile pushed in configuration.

9. Device according to claim 6 wherein said fastened together abutments are fixed to said chassis and said independent abutment is fixed to said anchor plate.

10. Device according to claim 1 wherein said chassis includes a horizontal plate to which is attached a vertical plate carrying said lifting means and said first abutment and locking means.

11. Device according to claim 1 wherein said maneuvering bar is pivoted about a horizontal shaft to a member disposed under said chassis and pivoted to the latter about a vertical shaft.

12. Device according to claim 11 wherein said maneuvering bar enables a turning angle of said wheels relative to a longitudinal plane of the dolly greater than the maneuvering angle of said bar.

13. Device according to claim 1 wherein said complementary temporary locking means include a longitudinal bar mounted to slide relative to said maneuvering bar and a receiving block fastened to said chassis and including a housing adapted to receive a front end of said longitudinal bar in a pushed in configuration of the latter.

14. Device according to claim 13 wherein said receiving block is fixed under said chassis.

\* \* \* \* \*

UNITED STATES PATENT AND TRADEMARK OFFICE
CERTIFICATE OF CORRECTION

PATENT NO. : 5,513,940
DATED : May 7, 1996
INVENTOR(S) : Florentin et al

Page 1 of 2

It is certified that error appears in the above-indentified patent and that said Letters Patent is hereby corrected as shown below:

Column 2, line 32, after "other" insert ---- and ----.

Column 2, line 49, delete "transverse." insert ---- transverse axis ----.

Column 5, line 11, after "maneuvering" insert ---- bar ----.

Column 5, line 17, delete "a" first occurrence, insert ---- at ----.

Column 5, line 48, delete "be" insert ---- bar ----.

Column 7, line 46, delete "bar".

Column 8, line 25 delete "a".

Column 8, line 33, delete ", as required," insert ---- ; and ----.

UNITED STATES PATENT AND TRADEMARK OFFICE
CERTIFICATE OF CORRECTION

PATENT NO. : 5,513,940
DATED : May 7, 1996
INVENTOR(S) : Florentin et al

It is certified that error appears in the above-indentified patent and that said Letters Patent is hereby corrected as shown below:

Column 9, line 12, delete "tile" insert ---- the ----.

Signed and Sealed this

Seventeenth Day of December, 1996

Attest:

BRUCE LEHMAN

*Attesting Officer*  *Commissioner of Patents and Trademarks*